United States Patent
Nakayama et al.

(10) Patent No.: US 6,759,653 B2
(45) Date of Patent: Jul. 6, 2004

(54) PROBE FOR SCANNING MICROSCOPE PRODUCED BY FOCUSED ION BEAM MACHINING

(75) Inventors: Yoshikazu Nakayama, Hirakata (JP); Seiji Akita, Izumi (JP); Akio Harada, Osaka (JP); Takashi Okawa, Osaka (JP); Yuichi Takano, Osaka (JP); Masatoshi Yasutake, Sunto-gun (JP); Yoshiharu Shirakawabe, Sunto-gun (JP)

(73) Assignees: Yoshikazu Nakayama, Osaka (JP); Daiken Chemical Co., Ltd., Osaka (JP); Seiko Instruments Inc., Chiba (JP)

( * ) Notice: Subject to any disclaimer, the term of this patent is extended or adjusted under 35 U.S.C. 154(b) by 0 days.

(21) Appl. No.: 10/182,330
(22) PCT Filed: Sep. 28, 2001
(86) PCT No.: PCT/JP01/08614

§ 371 (c)(1),
(2), (4) Date: Jul. 26, 2002

(87) PCT Pub. No.: WO02/42743

PCT Pub. Date: May 30, 2002

(65) Prior Publication Data

US 2003/0029996 A1 Feb. 13, 2003

(30) Foreign Application Priority Data

Nov. 26, 2000 (JP) ........................................ 2000-403560

(51) Int. Cl.[7] ............................ G21K 7/00; G12B 21/02
(52) U.S. Cl. ........................................ 250/306; 73/105
(58) Field of Search ............................ 250/306, 442.1; 73/105

(56) References Cited

U.S. PATENT DOCUMENTS

| | | | |
|---|---|---|---|
| 6,538,254 B1 * | 3/2003 | Tomimatsu et al. | 250/442.11 |
| 2003/0122072 A1 * | 7/2003 | Kaito et al. | 250/306 |

FOREIGN PATENT DOCUMENTS

| | | |
|---|---|---|
| EP | 1 054 249 A1 | 11/2000 |
| JP | H11-326348 | 11/1999 |
| JP | 2000-268741 | 9/2000 |
| JP | 2000-340098 | 12/2000 |
| WO | WO 98/15668 | 4/1998 |
| WO | WO 00/33052 | 6/2000 |

OTHER PUBLICATIONS

Stanislaus et al. ("Covalently functionalized nanotubes as nanometer-sized probes in chemistry and biology", Nature, vol. 394, Jul. 2, 1998).*

* cited by examiner

Primary Examiner—John R. Lee
Assistant Examiner—James J. Leybourne
(74) Attorney, Agent, or Firm—Koda & Androlia

(57) ABSTRACT

A scanning type microscope that captures substance information of the surface of a specimen by the tip end of a nanotube probe needle fastened to a cantilever, in which an organic gas is decomposed by a focused ion beam in a focused ion beam apparatus, and the nanotube is bonded to the cantilever with a deposit of the decomposed component thus produced. With this probe, the quality of the nanotube probe needle can be improved by removing an unnecessary deposit adhering to the nanotube tip end portion using a ion beam, by cutting an unnecessary part of the nanotube in order to control length of the probe needle and by injecting ions into the tip end portion of the nanotube.

8 Claims, 4 Drawing Sheets

PROBE FOR SCANNING MICROSCOPE PRODUCED BY FOCUSED ION BEAM MACHINING

TECHNICAL FIELD

The invention is related to a probe for a scanning type microscope which images a surface structure of a specimen, wherein nanotubes such as a carbon nanotube, BCN (boron carbon nitride) series nanotube, BN (boron nitride) series nanotube, etc. are used for the probe needle, in more detail, related to a probe for a scanning type microscope produced by focused ion beam machining which is manufactured by means of processes such as the nanotube of fastening, purifying and cutting using a focused ion beam apparatus.

BACKGROUND ART

In order to image a surface structure of a specimen by an atomic force microscope abbreviated as AFM, a scanning needle is needed which is caused to approach to the surface of the specimen for getting information from it. As the scanning needle, a cantilever made of silicon or silicon-nitride, on the tip of which a protruding portion (or pyramid portion) is formed, has been known in the past.

A conventional cantilever is formed by means of the micro-fabrication technique such as lithography, etching, etc. Since the cantilever detects atomic force from the surface of specimen by the tip of protruding portion, the degree of cleanness of an image is determined by the degree of sharpness of the tip portion. Then, in the sharpening treatment of the tip end of the protruding portion serving as a probe needle, an oxide process and an etching process for an oxide film which are sort of semi-conductor process technique are utilized. However, there is a lower limit in a reduction of size even in the semi-conductor process technique, so that the degree of sharpness of the tip end of the protruding portion described above is also physically limited.

On the other hand, a carbon nanotube was discovered as a carbon matter having a new structure. The carbon nanotube is from about 1 nm to several 10 nm in diameter and several $\mu$m in length, and its aspect ratio is around 100~1000. It is difficult to form a probe needle of 1 nm diameter by means of the present technique of semiconductor. Therefore, in this respect, the carbon nanotube provides best condition for the probe needle of an AFM.

In such a situation, H. Dai and others published, in Nature (Vol.384, Nov. 14, 1996), a report with respect to an AMF probe in which a carbon nanotube is stuck on the tip of the protruding portion of a cantilever. Though the probe proposed by them was of epoch-making, the carbon nanotube fell off from the protruding portion during repeatedly scanning surfaces of specimens, since the carbon nanotube was simply stuck on the protruding portion In order to solve this weak point, the present inventors have achieved to develop a method fastening firmly the carbon nanotube to the protruding portion of the cantilever. Results of this invention have been published as the Japanese patent application laid-open (Kokai) Nos. 2000-227435 and 2000-249712.

The first fastening method above-mentioned is that a coating film is formed in an electron microscope by irradiating an electron beam to the base end portion of a nanotube, and next the nanotube is fastened to the cantilever by means of covering the nanotube with the coating film. The second method is that the base end portion of the nanotube is fusion-fastened to the protruding portion of the cantilever by irradiating an electron beam on the base end portion of the nanotube or by causing to flow current, in an electron microscope.

It is a quite skilful method to fasten by coating or fusion-welding a nanotube base end portion using an electron beam, while enlarging an object image by means of an electron microscope. However, there is a limit in energy intensity of an electron beam of the electron microscope, so that this fact causes to yield a limit for coating-strength or fusion-welding-strength, and as the result, it was difficult to obtain fastening-strength beyond a certain degree.

Besides, lengths of nanotubes produced by an arc-discharge are inhomogeneous, so that it is necessary finally to homogenize quality of the nanotube products by unifying the lengths of the nanotubes. However, due to the above limit in the electron microscope, the cutting process of the nanotube has difficult points, so that the control of the nanotube length was not enough well done.

Furthermore, since an electron microscope is a device for treating electron beams, though it is possible to irradiate an electron beam, but being impossible to diffuse atoms of another element, or to implant ions into a probe needle nanotube, therefore, the improvement of the quality of nanotubes has not been progressed The essential aim of the electron microscope is to obtain enlarged images of specimens in a clean imaging room being in the vacuum state. However, when an organic gas flows into this electron microscope and decomposes, a body-tube and the imaging room, which should be clean, are polluted with the organic gas or the decomposed matter. If this pollution gas is absorbed in and re-emitted from a wall-surface, the gas adheres to a surface of a cantilever. But, since it is difficult to remove the adhered pollution matter by an electron beam, this fact shows that there is a technical limit of the electron microscope, in manufacture of the nanotube probe needle.

Accordingly, an object of the present invention is to find an apparatus other than the electron microscope as a device in which the nanotube is fastened to a protruding portion of a cantilever, and to provide a probe for a scanning type microscope which can fasten and cut a nanotube probe needle and furthermore can improve the quality of the nanotube probe needle by implanting another element atoms, etc.

DISCLOSURE OF INVENTION

The present invention provides, in a probe for a scanning type microscope, by which substance information of a specimen is obtained by means of a tip end of a nanotube probe needle fastened to a cantilever; a probe for a scanning type microscope produced by focused ion beam machining, which is characterized in that the nanotube is fastened to a cantilever with a decomposed deposit produced by decomposing an organic gas by means of a focused ion beam in a focused ion beam apparatus.

The present invention provides a probe for a scanning type microscope described in the first part of the present invention, wherein a hydrocarbon is used for the above described organic gas.

The present invention provides a probe for a scanning type microscope described in the first part of the present invention, wherein an organic-metallic gas is used for the above described organic gas.

The present invention provides a probe for a scanning type microscope described in the first part of the present invention, wherein a silicon cantilever, a silicon-nitride cantilever or a cantilever coated with a conductive substance are utilized as the above described cantilever.

The present invention provides a probe for the scanning microscope produced by focused ion beam machining which is characterized in that unnecessary matter existing in a predetermined region is removed by irradiating an ion beam to the predetermined region of a nanotube probe needle fastened to the cantilever.

The present invention provides a probe for a scanning type microscope described in the fifth part of the present invention, wherein the above described unnecessary matter is a unnecessary deposit heaping up at a tip end portion of the nanotube probe needle or a unnecessary deposit heaping up near a base end portion of the nanotube.

The present invention provides a probe for the scanning microscope produced by focused ion beam machining which is characterized in that an unnecessary part of the nanotube probe needle is cut off and the length of tip end portion of the nanotube probe needle is controlled by irradiating an ion beam to the tip end portion of the nanotube probe needle fastened to the cantilever.

The present invention provides a probe for a scanning type microscope described in the seventh part of the present invention, wherein the nanotube is cut in a perpendicular or an oblique direction, in the cutting of the unnecessary part above described.

The present invention provides a probe for the scanning microscope produced by focused ion beam machining which is characterized by changing physical and chemical qualities of the probe needle by irradiating an ion beam to the predetermined region of the tip end portion of the nanotube probe needle fastened to the cantilever.

The present invention provides a probe for a scanning type microscope described in the ninth part of the present invention, wherein the above described ion element is fluorine, boron, gallium, or phosphorus.

The present inventors had earnestly investigated a device being substituted for an electron microscope, and as the result, had gotten an idea to use an ion beam instead of an electron beam; specifically had achieved an idea to utilize a focused ion beam apparatus (abbreviated as FIB apparatus) which can focus at will the ion beam and can process an object.

This FIB apparatus is a device by which various atoms are ionized, the ions are accelerated by means of an applied electric field, and this ion beam is focused by means of an electric field lens so that the beam section is made fine and the beam comes to be a high energy state, and by which a target is processed by means of irradiating the resultant focused ion beam to the target. Accordingly, the FIB apparatus comprises partial devices such as an ion source, an acceleration apparatus, a beam-focusing apparatus and a beam-operating device, etc.

An applied voltage can be freely arranged, and the energy of the ion beam can be arbitrarily set up by the acceleration apparatus. Various processes for nanotubes are possible by means of arrangement of the energy of the ion beam. By the present invention, an organic gas which is induced into a reaction chamber of the FIB apparatus is decomposed by the ion beam. Leaving a nanotube base end portion adhered to a protruding portion of a cantilever disposed in the reaction chamber, the above described decomposed gas heaps up on this base end portion, so that the nanotube is strongly fastened to the protruding portion of the cantilever by this decomposed deposit. In this manner, the ~ related to the present invention is accomplished.

In a case where the organic gas is a hydrocarbon gas, the above described decomposed deposit is a carbon deposit, and the nanotube is fastened to the protruding portion by means of this carbon deposit. In a case where the organic gas is an organic-metallic gas, the above described decomposed deposit is a metallic deposit, and the nanotube is fastened in a conductive state to the protruding portion by means of this metallic deposit.

As substances of the above-described hydrocarbon series, there are hydrocarbons of methane series, hydrocarbons of ethylene series, hydrocarbons of acetylene series, cyclic hydrocarbons, etc.; more concretely saying, hydrocarbons of less molecular-weight such as ethylene or acetylene are favorable among them. Furthermore, as the above-described organic-metallic gases, the following gases can be utilized; for examples, $W(CO)_6$, $Cu(hfac)_2$, (hfac: hexa-flouro-acetyl-acetonate), $(CH_3)_2AlH$, $Al(CH_2\text{—}CH)(CH_3)_2$, $[(CH_3)_3Al]_2$, $(C2H_5)_3Al$, $(CH_3)_3Al$, $(I\text{—}C_4H_9)_3Al$, $(CH_3)_3AlCH_3$, $Ni(CO)_4$, $Fe(CO)_4$, $Cr[C_6H_5(CH_3)_2]$, $Mo(CO)_6$, $Pb(C_2H_5)_4$, $Pb(C_5H_7O_2)_2$, $(C_2H_5)_3PbOCH_2C(CH_3)_2$, $(CH_3)_4Sn$, $(C_2H_5)_4Sn$, $Nb(OC_2H_5)_5$, $Ti(i\text{-}OC_3H_7)_4$, $Zr(C_{11}H_{19}O_2)_4$, $La(C_{11}H_{19}O_2)_3$, $Sr[Ta(OC_2H_5)_6]_2$, $Sr[Ta(OC_2H_5)_5(Oc_2H_4OcH_3)]_2$, $Ba(C_{11}H_{19}O_2)_2$, $(Ba,Sr)_3(C_{11}H_{19}O_2)$, $Pb(C_{11}H_{19}O_2)_2$, $Zr(OtC_4H_9)_4$, $Zr(OiC_3H_7)(C_{11}H_{19}O_2)_3$, $Ti(OiC_3H_7)_2(C_{11}H_{19}O_2)$, $Bi(OtC_5H_{11})_3$, $Ta(OC_2H_5)_5$, $Ta(OiC_3H_7)_5$, $Nb(OiC_3H')_5$, $Ge(OC_2H_5)_4$, $Y(C_{11}H_{19}O_2)_3$, $Ru(C_{11}H_{19}O_2)_3$, $Ru(C_5H_4C_2H_5)_2$, $Ir(C_5H_4C_2H_5)(C_8H_{12})$, $Pt(C_5H_4C_2H_5)(CH_3)_3$, $Ti[N(CH_3)_2]_4$, $Ti[N(C2H5)2]4$, $As(OC_2H_5)_3$, $B(OC_2H_5)_3$, $Ca(OCH_3)_2$, $Ce(OC"H_5)_3$, $Co(OiC_3H_7)_2$, $Dy(OiC_3H_7)_2$, $Er(OiC_3H_7)_2$, $Eu(OiC_3H_7)_2$, $Fe(OCH_3)_3$, $Ga(OCH_3)_3$, $Gd(OiC_3H_7)_3$, $Hf(OCH_3)_4$, $In(OCH_3)_3$, $KOCH_3$, $LiOCH_3$, $Mg(OCH_3)_2$, $Mn(OiC_3H_7)_2$, $NaOCH_3$, $Nd(OiC_3H_7)_3$, $Po(OCH_3)_3$, $Pr(OiC_3H_7)_3$, $Sb(OCH_3)_3$, $Sc(OiC_3H_7)_3$, $Si(OC_2H_5)_4$, $VO(OCH_3)_3$, $Yb(OiC_3H_7)_3$, $Zn(OCH_3)_2$, etc.

As for the nanotube, there are a conductive carbon nanotube or an insulation nanotube of BN series and of BCN series. And as for the cantilever for an AFM, there are a semi-conduction silicon cantilever and an insulation silicon-nitride cantilever. But a conductive cantilever can be manufactured by coating on a cantilever surface including the protruding portion with a conductive film such as metal, etc. and in the similar manner, the insulation nanotube can be transmuted to a conductive nanotube.

Accordingly, a conductive probe for an ion type scanning type microscope can be manufactured by means of electrically connection of the conductive nanotube with the conductive cantilever using a conductive deposit such as a metallic deposit. The conductive probe, owing to its conductivity, can be utilized not only for the AFM but also for a STM (tunneling microscope) which detects a tunnel-current. However, if the semi-conduction cantilever or the insulation cantilever is used as a cantilever, the cantilever, due to non-conductivity, can be used as the probe for an ordinary AFM which detects flexion.

As for the probe for the scanning type microscope related to the present invention, there are not only the above-described AFM and STM, but also a level force microscope (LFM) which detects differences of a surface by means of friction force, a magnetic force microscope (MFM) which detects magnetic interaction, an electric-field force microscope (EFM) which detects a gradient of an electric field, and a chemical force microscope (CFM) which images surface distribution of a chemical function group. All such microscopes are for obtaining surface information of specimens at the atomic level.

The tip end of a nanotube is a probe needle for detection. If an unnecessary deposit adheres to the tip end of the nanotube, this portion works as a probe needle so that the tip end of the nanotube captures error information and the image is caused to be dim. Accordingly, the unnecessary deposit adhering to the nanotube tip end portion is removed by means of ion beam irradiation, by increasing the ion beam energy of the FIB apparatus higher.

As was described above, in the present invention, the tip end portion of the nanotube is fastened to the protruding portion of the cantilever by means of the decomposed deposit. In a case where this decomposed deposit is formed to expand up to an unnecessary region, second processes such as a formation of a conductive film, etc. are caused to be difficult. In such a case, this unnecessary decomposed deposit near the base end portion can be removed by means of irradiation of a focused ion beam.

Length of produced nanotubes is in general quite indefinite. However, in order to unify nanotube quality, it is necessary to make uniform the lengths of the nanotube tip ends. Then, by solution-cutting the unnecessary parts of the nanotubes by means of the ion beam, the length of the nanotube is controlled. For this purpose, the energy of the ion beam is increased or an irradiation period is arranged.

In addition, in order to improve a quality of the nanotube tip end, ions can be shot into the nanotube by the FIB apparatus. Ions accelerated in high energy can be shot into the inner space of the nanotube, but low energy ions is driven on a surface layer of the nanotube and coats the surface of the nanotube. Particularly, when ions are shot into the tip end of the nanotube probe needle, these ions directly act to a surface of a specimen.

As the sort of the ion, an arbitrary element can be chosen, for examples, such as fluorine, boron, gallium, or phosphorus, etc. These atoms react on a carbon atom in the nanotube to form CF-combination, CB-combination, CGa-combination or CP-combination, which come to possess specific properties for these combinations.

In a case where the ions shot into the tip end of the nanotube are ferromagnetic atoms such as Fe, Co, Ni, etc., this probe for a scanning type microscope can be utilized for an MFM. That is, since these ferromagnetic atoms detect ferromagnetism of a surface of a specimen at the atomic level, this technique can greatly contribute to the progress of substance engineering such as the resolution of magnetic structure of a sample substance, etc.

BEST MODE FOR CARRYING OUT THE INVENTION

In the following modes of probe for the scanning microscope produced by focused ion beam machining according to the present invention will be described in detail with reference to the accompanying drawings.

Figure 1:
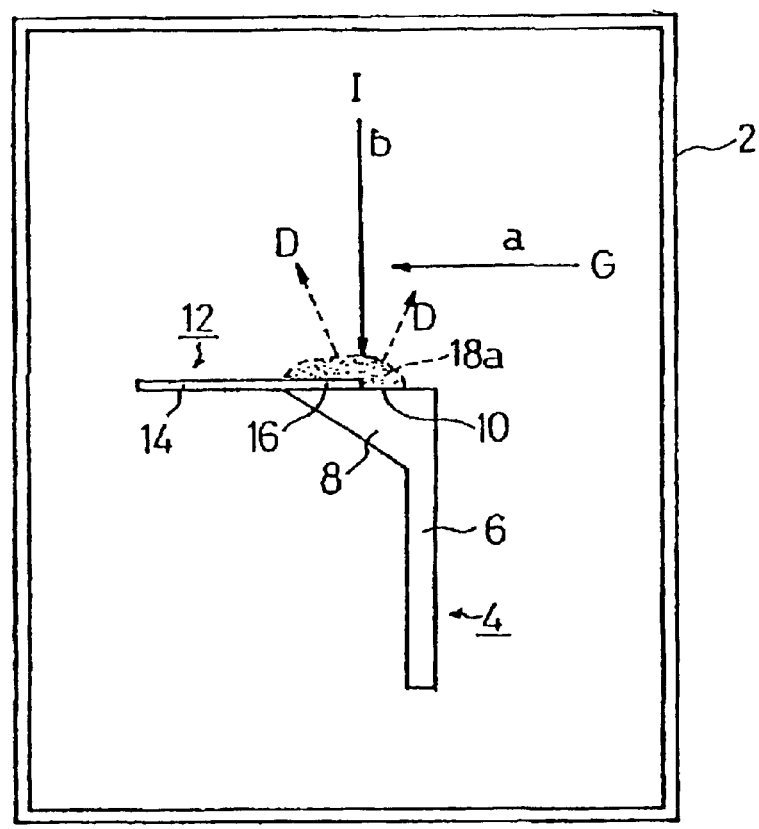
FIG. 1 is a schematic diagram of an apparatus, by which a probe for a scanning type microscope is manufactured using a focused ion beam.

FIG. 1 is a schematic diagram showing an apparatus by which a probe for a scanning type microscope is manufactured by using a focused ion beam. In the focused ion beam apparatus 2, a cantilever 4 is disposed, and this cantilever 4 comprises a cantilever portion 6 and a protruding portion 8 called a pyramidal portion.

The base end portion 16 of the nanotube 12 is adhered on a surface 10 of the protruding portion 8 and a tip end portion 14 is disposed in a protruding fashion on the surface 10. The nanotube 12 may be adhered in the focused ion beam apparatus 2, or may be disposed in the focused ion beam apparatus 2, after being adhered in an electron microscope which is not drawn here.

An organic gas G is driven from outside into the focused ion beam apparatus 2, and is caused to flow to the arrow direction a. This organic gas G is absorbed to adhere to near the nanotube 12, and an adhesion matter 18a of the organic gas is formed. The organic gas G is decomposed when a focused ion beam I is irradiated in the arrow direction b against the adhesion matter of the organic gas, so that light molecules D such as a hydrogen component, etc. are scattered in the dotted line direction. On the other hand, decomposed components such as a carbon component and a metallic component, etc. heap up near the base end portion 16 of the nanotube 12 to form a decomposed deposit 18. The cantilever 6 and the probe 12 are combined by this decomposed deposit 18 and the probe for the scanning type microscope 20 (hereafter called probe 20) is accomplished.

Figure 2:
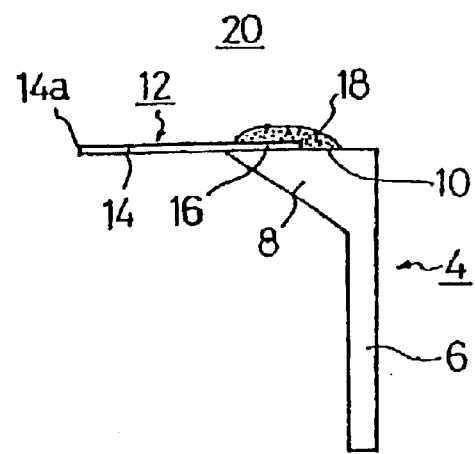
FIG. 2 is a schematic diagram explaining an accomplished probe for an ion type scanning microscope.

FIG. 2 is a schematic diagram showing an accomplished probe for the scanning microscope produced by focused ion beam machining. The base end portion 16 of the nanotube 12 is firmly fastened to the surface 10 of a protruding portion by a decomposed deposit 18. The durability of the probe 20 depends on the fastening strength of the decomposed deposit 18 which serves as a coating film. The fastening strength of the decomposed deposit 18 is decided by the denseness of the decomposed deposit 18 and the fitness (combination degree) of the decomposed deposit 18 to the surface 10 of the protruding portion.

The decomposed deposit formed carbon film, when gases of hydrocarbon series such as an ethylene, an acetylene, a methane, etc. are used as the organic gas. The carbon film comprises amorphous carbon and is conductive in a case where the film thickness is extremely thin. Accordingly, making the carbon film thin, the nanotube 12 and the cantilever 4 can be set so as to be electrically connected through the carbon film.

Furthermore, when an organic-metallic gas is used for the organic gas, a metallic component is produced as a decomposed component in a collision-decomposition reaction of the gas with an ion beam, and the metal heaps up near the nanotube base end portion 16 and forms a metal film which composes the decomposed deposit. In the same manner as the above described carbon film, the nanotube 12 and the cantilever 4 can be set in an electrically connected state through the metal film.

As described above, the following gases can be utilized as organic-metallic gases; for examples, $W(CO)_6$, $Cu(hfac)_2$, (hfac: hexa-flouro-acetyl-acetonate), $(CH_3)_2AlH$, $Al(CH_2—CH)(CH_3)_2$, $[(CH_3)_3Al]_2$, $(C2H_5)_3Al$, $(CH_3)_3Al$, $(I—C_4H_9)_3Al$, $(CH_3)_3AlCH_3$, $Ni(CO)_4$, $Fe(CO)_4$, $Cr[C_6H_5(CH_3)_2]$, $Mo(CO)_6$, $Pb(C_2H_5)_4$, $Pb(C_5H_7O_2)_2$, $(C_2H_5)_3PbOCH_2C(CH_3)_2$, $(CH_3)_4Sn$, $(C_2H_5)_4Sn$, $Nb(OC_2H_5)_5$, $Ti(i-OC_3H_7)_4$, $Zr(C_{11}H_{19}O_2)_4$, $La(C_{11}H_{19}O_2)_3$, $Sr[Ta(OC_2H_5)_6]_2$, $Sr[Ta$ $(OC_2H_5)_5(Oc_2H_4OcH_3)]_2$, $Ba(C_{11}H_{19}O_2)_2$, $(Ba,Sr)_3$ $(C_{11}H_{19}O_2)$, $Pb(C_{11}H_{19}O_2)_2$, $Zr(OtC_4H_9)_4$, $Zr(OiC_3H_7)$ $(C_{11}H_{19}O_2)_3$, $Ti(OiC_3H_7)_2(C_{11}H_{19}O_2)$, $Bi(OtC_5H_{11})_3$, $Ta(OC_2H_5)_5$, $Ta(OiC_3H_7)_5$, $Nb(OiC_3H')_5$, $Ge(OC_2H_5)_4$, $Y(C_{11}H_{19}O_2)_3$, $Ru(C_{11}H_{19}O_2)_3$, $Ru(C_5H_4C_2H_5)_2$, $Ir(C_5H_4C_2H_5)(C_8H_{12})$, $Pt(C_5H_4C_2H_5)(CH_3)_3$, $Ti[N(CH_3)_2]_4$, $Ti[N(C2H5)2]4$, $As(OC_2H_5)_3$, $B(OC_2H_5)_3$, $Ca(OCH_3)_2$, $Ce(OC"H_5)_3$, $Co(OiC_3H_7)_2$, $Dy(OiC_3H_7)_2$, $Er(OiC_3H_7)_2$, $Eu(OiC_3H_7)_2$, $Fe(OCH_3)_3$, $Ga(OCH_3)_3$, $Gd(OiC_3H_7)_3$, $Hf(OCH_3)_4$, $In(OCH_3)_3$, $KOCH_3$, $LiOCH_3$, $Mg(OCH_3)_2$, $Mn(OiC_3H_7)_2$, $NaOCH_3$, $Nd(OiC_3H_7)_3$, $Po(OCH_3)_3$, $Pr(OiC_3H_7)_3$, $Sb(OCH_3)_3$, $Sc(OiC_3H_7)_3$, $Si(OC_2H_5)_4$, $VO(OCH_3)_3$, $Yb(OiC_3H_7)_3$, $Zn(OCH_3)_2$, etc.

As to the deposit 18, not only conductive deposits such as the above described carbon film and metal film but also an insulation deposit and a semi-conduction deposit are included. When gases of hydrocarbon series or organic-metallic gases heap up to be in a semi-decomposition state, these tend to form insulation deposits. In a case of a silicon film, according to the crystal type of the film, various deposits are formed, i.e. from a semi-conduction deposit to an insulation deposit.

Figure 3:
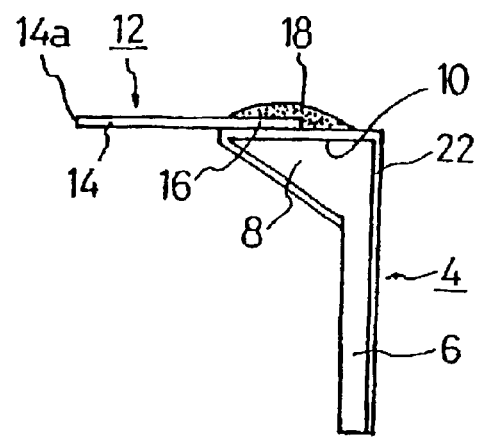
FIG. 3 is a schematic diagram explaining a probe for an ion type scanning microscope in which a conductive cantilever is used.

FIG. 3 is a schematic diagram showing a probe for a scanning type microscope using a conductive cantilever. A conductive cantilever is composed by means of forming an electrode film 22 on the cantilever 4. As a nanotube 12, a conductive carbon nanotube is used, then the nanotube 12 and the cantilever 4 are electrically connected each other through a conductive deposit 18, so that a voltage can be applied between a specimen and the nanotube 12 though an external power supply which is not shown in the diagram.

Describing it in detail, as the nanotube 12, there are, for examples, a conductive carbon nanotube, an insulation BN series nanotube, a BCN series nanotube, etc. Also, as the cantilever 4, there are a conductive cantilever, a semi-conduction silicon cantilever, an insulation silicon-nitride cantilever, etc. Furthermore, as the deposit 18, there are a conductive deposit, a semi-conduction deposit and an insulation deposit.

Though the nanotube 12 seems to contact with a protruding surface 10 of the cantilever, depending on the magnitude of electric contact resistance or due to the existence of interposition, both are not necessarily electrically connected. Then, the electric property of the deposit 18 connecting both is important. Therefore, according to the way of combination of the nanotube 12, the deposit 18 and the cantilever 4, either the electric connection or disconnection between the nanotube 12 and the cantilever 4 is certainly decided.

Figure 4:
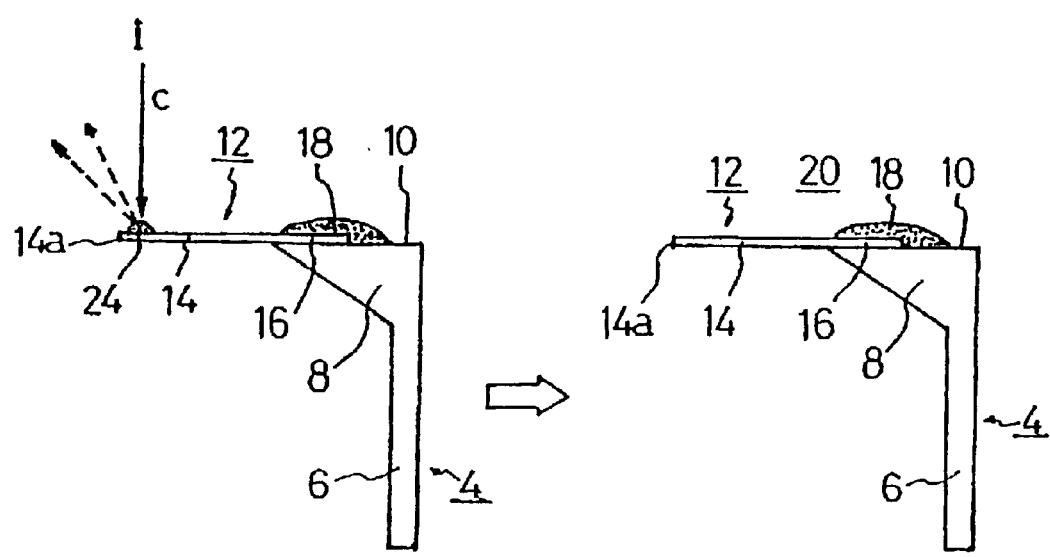
FIG. 4 is a schematic diagram explaining a method to remove an unnecessary deposit by using a focused ion beam.

FIG. 4 is a schematic diagram showing the method to remove an unnecessary deposit by using a focused ion beam. Decomposed gases of the organic gas form not only the deposit 18 which fastens a nanotube but also occasionally an unnecessary deposit 24 by adhering to the tip end portion of the nanotube 12. The unnecessary deposit 24 thus produced causes to reduce the imaging power of the nanotube 12.

Therefore, the unnecessary deposit 24 is scattered as shown by dotted arrow-lines by irradiating the focused ion beam I in the direction of the arrow c against the unnecessary deposit 24. As the result, only a tip end 14a is remained at the probe needle point of the nanotube 12, so that the imaging power can be recovered. In this manner, the unnecessary deposit on the nanotube 12 or the cantilever 4 can be removed by using the focused ion beam I.

Figure 5:
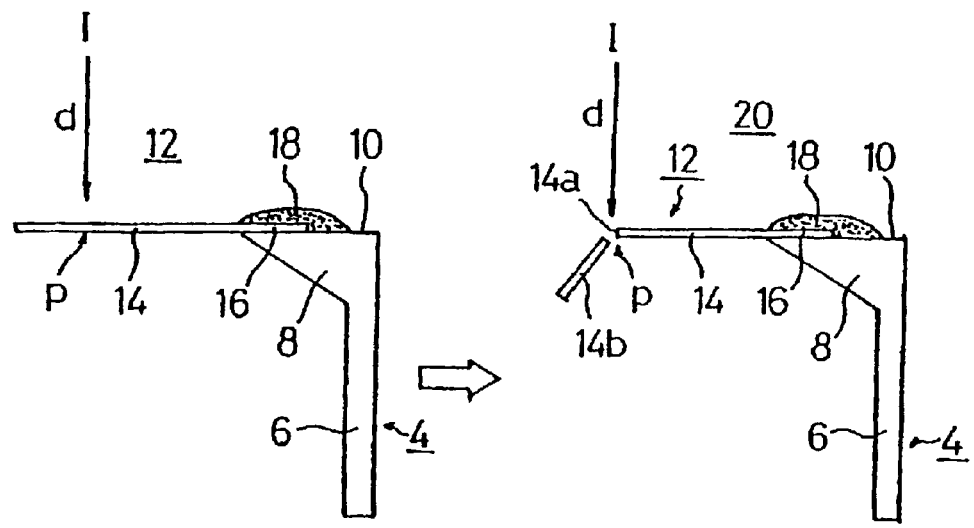
FIG. 5 is a schematic diagram explaining a method to control length of nanotube by means of a focused ion beam.

FIG. 5 is a schematic diagram showing a method to control nanotube length by using a focused ion beam. The length of nanotube 12 is spreading over from nano-order to micron-order. When the tip end portion of the nanotube 12 is long, the tip end portion oscillates, so that a sharp image of the surface of specimen cannot be obtained. Therefore, in order to unify the operation quality of a probe 20 and to increase its efficiency, it is necessary to uniform the length of the tip end portion 14 of the nanotube. Then, in order to control the length of the tip end portion 14 of the nanotube, the unnecessary portion should be cut off.

For the cutting off, solution-cutting force of the focused ion beam is utilized. Since an energy density of the ion beam can be controlled by increasing acceleration energy or by increasing a degree of focusing of the focused ion beam, it is possible to give the energy density enough for solution-cutting off the nanotube to the focused ion beam I. When this focused ion beam is irradiated against a cut region P in the arrow direction d, the cut region P melts and the tip end portion is cut off like a cut peace 14b. Thus, the section turns to a new tip end 14a. In this example, the section is perpendicular against an axis direction of the nanotube 12.

Figure 6:
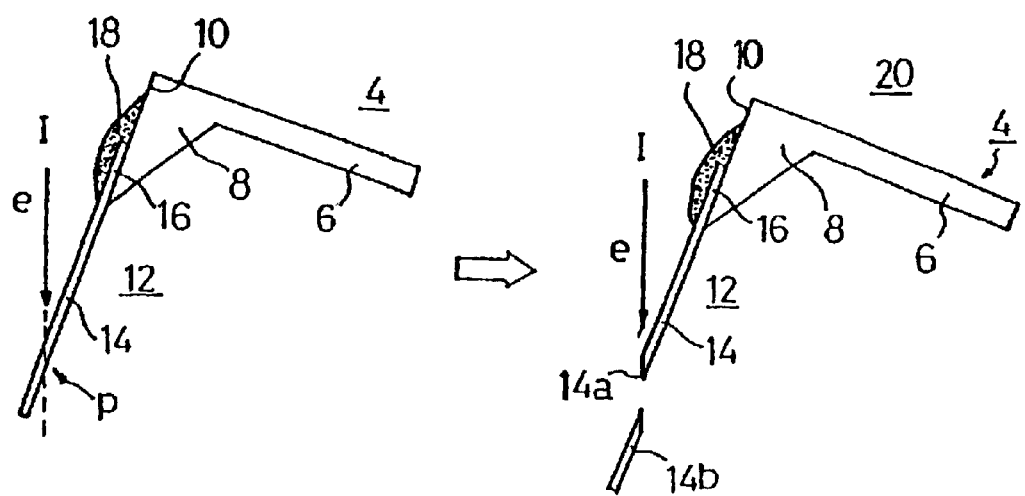
FIG. 6 is a schematic diagram explaining a case where a nanotube is cut in an oblique direction.

FIG. 6 is a schematic diagram showing a method to cut obliquely the nanotube. In this case, the focused ion beam I is irradiated in an oblique direction (arrow direction e) against the nanotube 12. By means of this oblique cut, the tip end 14a of the nanotube comes to be quite sharp, so that this cutting method can provide a probe 20 possessing higher quality than the perpendicular cutting method shown in FIG. 5. The reason is that the more sharp is the tip end 14a, the higher a resolution for a surface image of specimen increases.

Figure 7:
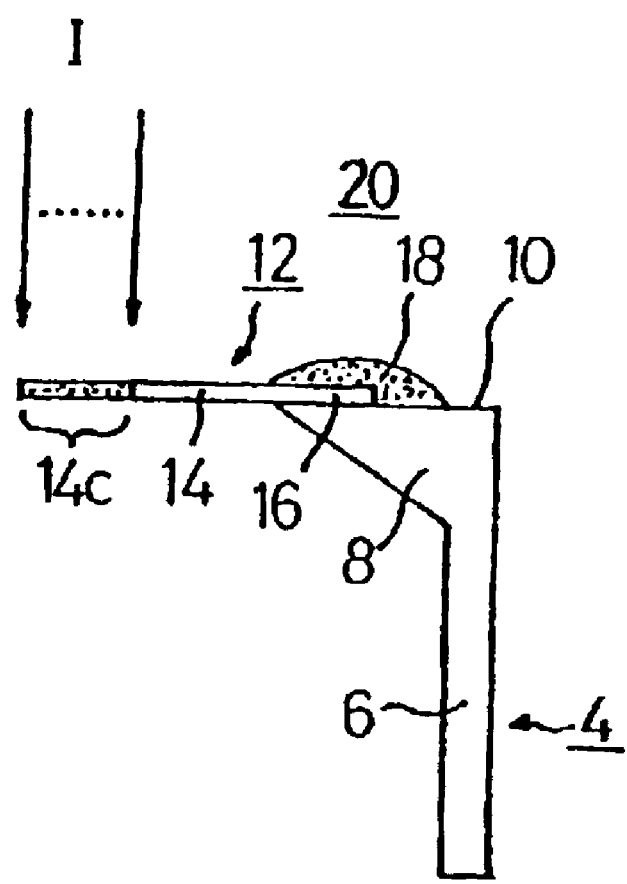
FIG. 7 is a schematic diagram explaining a case where a quality of a nanotube tip end portion is improved.

FIG. 7 is a schematic diagram showing a method to improve the quality of the tip end of the nanotube. By irradiating the focused ion beam I to the tip end region 14c of the tip end portion 14 of the nanotube 12, ions are driven into the tip end region. According as an acceleration voltage applied to the focused ion beam, various cases occur such that an ion film is formed on the surface of the tip end region 14c, the ions replace constituent atoms of the nanotube or fall, as solid solution, into holes of an atomic surface, and or the ions are injected into an inner space of the tip end region 14c.

In a case where, as the sort of the ions, for examples, fluorine, boron, gallium, or phosphorus, etc. are employed, these atoms react on carbon atoms in the nanotube to form CF-combination, CB-combination, CGa-combination or CP-combination, which are caused to possess the specific property corresponding to each combination. In a case where the ions are ferromagnetic atoms such as Fe, Co, Ni, etc., ferromagnetism of the surface of a specimen can be detected at the atomic level.

Furthermore, the improvement of qualities of nanotubes includes the case to give conductivity to an insulation BN series nanotube or the BCN series nanotube by shooting metal ions to them and inversely, also the case to give insulation property to a conductive carbon nanotube by shooting insulation substance to the nanotube.

It is needless to say that the present invention is not limited to the above-described embodiments; and various modifications and design changes, etc. within this limits that involve no departure from the technical spirit of the present invention are included in the scope of the present invention.

INDUSTRIAL APPLICABILITY

According to the present invention, a nanotube and a cantilever are fastened to each other with a deposit which is made of decomposed component produced by decomposing organic gases using a focused in beam so that the fastness is quite firm, therefore, the present invention can provide a probe for a scanning type microscope in which the nanotube does not fall out from the cantilever in many times repeated use.

According to the present invention, since a hydrocarbon gas is used as an organic gas, if the decomposed deposit is made extremely thin so as to give the carbon film conductivity, the nanotube and cantilever are set in electrically connected state by means of the conductive carbon film and a voltage can be applied to flow current in the probe for the scanning type microscope.

According to the present invention, since a organic-metallic gas is used as an organic gas, the decomposed deposit with which the nanotube is fasten can be made a conductive metal film. By this strong conductive film, the nanotube and the cantilever are certainly electrically connected, so that a voltage can be applied to flow current in the probe for the scanning type microscope.

According to the present invention, since a semi-conduction silicon cantilever, an insulation silicon nitride cantilever or a cantilever coated with a conductive substance are utilized, by constructing a probe by means of combinations of the cantilever and nanotubes which possess various electric properties, the present invention can provide various probes for scanning type microscopes such as an insulation probe, semi-conductive probe, a conductive probe, etc.

According to the present invention, since an unnecessary deposit heaped up at a nanotube probe needle is removed by irradiating an ion beam, the present invention can provide a clean probe for a scanning type microscope which develops the ability as is designed.

According to the present invention, the present invention can provide a probe for a scanning type microscope, by which error information caused by an unnecessary deposit can be excluded by means of removing the unnecessary deposit at the tip end portion of a nanotube probe needle, and furthermore for which a second process such as a formation of a conductive film is easily performed by means of removing an unnecessary deposit near the base end portion.

According to the present invention, since an unnecessary part of a nanotube is cut off by irradiating an ion beam, oscillation of the tip end portion of the nanotube probe needle is eliminated so that resolution for the surface image of a specimen increases. Accordingly, the unification and increasing of the detection efficiency of a probe for a scanning type microscopes are achieved.

According to the present invention, in a case where the nanotube is perpendicularly cut, the section area is caused to be least so that the section is formed to be neat, or in a case where the nanotube is obliquely cut, the tip end of the section is formed to be quite sharp, therefore, the probe can follow indentations and projections on the surface of a specimen, as the result, the detection resolution of the microscope increase.

According to the present invention, since desired ions are shot into at least the tip end of the tip end portion of the nanotube probe needle, physical and chemical properties of the nanotube tip end portion can be changed as desired. Accordingly, the present invention can provide a probe for a scanning type microscope which sensitively reacts to specific physical and chemical actions from a specimen so that the probe for the scanning type microscope detects magnetic force and organic function groups of the surface of the specimen, and so on. For examples, by shooting ferromagnetic atoms into the tip end portion such as Fe, Co, Ni, etc. magnetism of the specimens can be effectively detected.

According to the present invention, by injecting fluorine, boron, gallium, or phosphorus, etc. and by causing to combine them with constituent atoms of the nanotube, the specific qualities corresponding to the combinations can be developed in the nanotube probe needle.

Needless to say, the present invention can be applied to cantilevers accompanied with the nanotubes which are manufactured by various apparatuses such as an electronic microscope or a focused ion beam apparatus.

What is claimed is:

1. A probe for a scanning type microscope which obtains substance information of a surface of a specimen by a tip end of a nanotube probe needle fastened to a cantilever, characterized in that a nanotube is fastened to said cantilever by a deposit of decomposed components produced by resolving an organic gas by use of an ion beam in a focused ion beam apparatus and scattering light molecules composing the organic gas.

2. The probe for a scanning type microscope according to claim 1, wherein said deposit comprises carbon atoms accumulated by using a hydrocarbon gas as said organic gas.

3. The probe for a scanning type microscope according to claim 1, wherein said deposit comprises metal atoms accumulated by nuns an organic-metallic gas as said organic gas.

4. The probe for a scanning type microscope according to claim 1, wherein said cantilever is coated with a conductive substance.

5. A probe for a scanning microscope produced by focused ion beam machining, characterized in that an unnecessary portion of a nanotube probe needle fastened to a cantilever is cut off by irradiating an ion beam at a tip end portion of said nanotube probe needle, and thus a length of said tip end portion of said nanotube probe needle is regulated to a predetermined length.

6. A probe for a scanning microscope produced by focused ion beam machining, characterized in that a part of nanotube components is charged by beaming ions at a tip end portion of a nanotube probe needle fastened to a cantilever, thus changing physical and chemical properties of said probe needle.

7. The probe for a scanning type microscope according to claim 6, wherein said ions are one selected from the group consisting of fluorine, boron, gallium, and phosphorus.

8. The probe for a scanning type microscope according to claim 5, wherein in cutting-off of said unnecessary portion, said nanotube is cut in an oblique direction thereof.

* * * * *